Sept. 11, 1951  M. W. HAZELTON  2,567,641
HYDRAULIC WORK HOLD-DOWN OR CLAMP
Filed July 28, 1949

INVENTOR.
MERRILL W. HAZELTON,
BY Allen & Allen
ATTORNEYS.

Patented Sept. 11, 1951

2,567,641

UNITED STATES PATENT OFFICE 2,567,641

HYDRAULIC WORK HOLD-DOWN OR CLAMP

Merrill W. Hazelton, Cincinnati, Ohio, assignor to The Cincinnati Shaper Company, Cincinnati, Ohio, a corporation of Ohio Application July 28, 1949, Serial No. 107,249

6 Claims. (Cl. 60—54.6)

My invention relates to a hydraulic work hold-down or clamp for use with machine tools such as shears or in any other machine or device where it is necessary to hold-down or clamp work or other objects.

My hydraulic hold-down is of the general type described in the Robert T. Hazelton Patent No. 1,881,185 issued October 4, 1932, but has specific advantages thereover. In a hydraulic hold-down of the piston type, the fluid which usually consists of oil has a tendency to seep past the piston. While this is an advantage in lubricating the walls of the cylinder, it also has the disadvantage of permitting oil at times to drip upon the work. It is an object of my invention to provide a hydraulic hold-down which has the advantage of permitting full lubrication of the piston, but prevents any of the oil which has seeped by the piston from dropping on the work under the hold-down.

A further object of my invention is to provide a hydraulic hold-down which is extremely long-lived in that the movable parts are formed solely of metal, but which will operate with great rapidity and smoothness.

These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawing which forms a part hereof, and in which.

Figure 1:
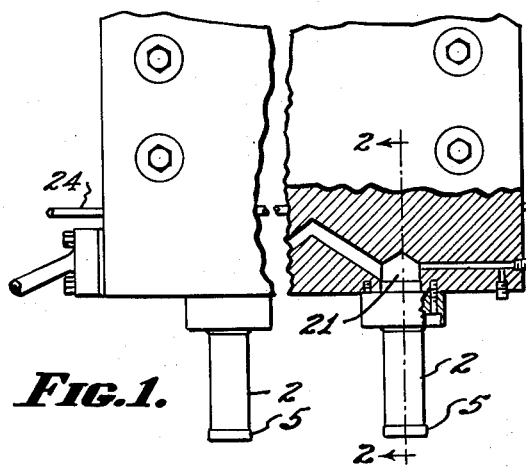
Figure 1 is a fragmentary front elevation with a portion broken away showing two of my novel hydraulic hold-downs.

Briefly, in the practice of my invention, I provide a hydraulically operated hold down having a metallic piston carrying rings reciprocated in a cylinder. Within the cylinder and below the travel of the piston, I provide a well which catches the oil which has seeped around the piston. This well has an outlet port which is connected to a suction line and which removes the accumulated oil from the well.

Another feature of my hydraulic hold-down is the piston itself, which is composed of three discs held together; the edges of the innermost disc is rabbeted out and carries three piston rings with two rings positioned side by side on top of an inner ring and with the slots of the three rings staggered so as to provide the tightly sealed piston.

Referring to the drawing, the piston 1 of my hold-down rides in the vertically mounted cylinder and has a piston rod 3 which projects from the lower edge 4 of the piston 2 and carries a hold-down foot 5.

The piston 1 itself is composed of three discs 6, 7, and 8 held together by a bolt 9 and a nut 10.

Figure 4:
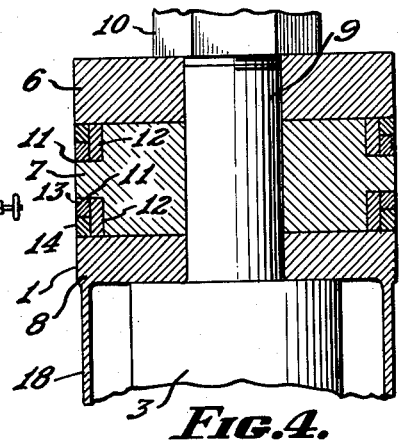
Figure 4 is a cross section of the piston used in my hydraulic hold down.
Figure 2:
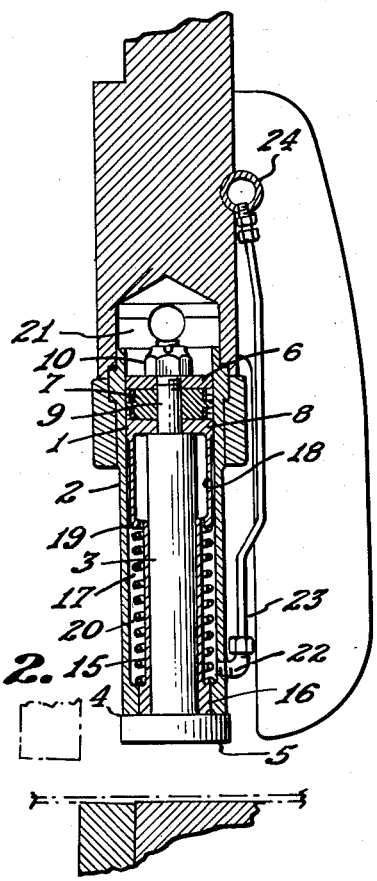
Figure 2 is a cross section of one of my hydraulic hold downs with the hold-down in its raised position.

The innermost disc 7 has grooves 11 rabbeted out on its edges to accommodate the piston rings 12, 13, and 14. These rings are slipped into place as shown in Figure 4 before the three discs 6, 7, and 8 are assembled together. By this means, the piston rings 12, 13, and 14 need not be sprung apart to slide over the piston, but are merely inserted into place. The piston ring 12 is beneath the piston rings 13 and 14 and the slots of all three rings are staggered in reference to each other to provide a good, permanent seal. Within the cylinder 2 and spaced from the walls thereof, I provide a tube 15 which at its bottom edge 16 is tightly fastened to the inner wall of the cylinder 2. The tube 15 surrounds the piston rod 3 and forms a well 17 between the cylinder wall 2 and the tube 15.

On the lower face of the piston 1, I provide a downwardly projecting skirt 18, the lower edge 19 of which at all times projects below the upper edge of the tube 15. The skirt 18 is of smaller diameter than the interior of the cylinder 2 so that it does not scrape the walls.

I provide a piston return spring 20 which is seated on the well bottom 17 with the top of the spring against the lower edge 19 of the skirt 18. The hold-down foot 5 is of greater diameter than the internal diameter of the cylinder 2 and hence limits the upward movement of the piston 1.

Figure 3:
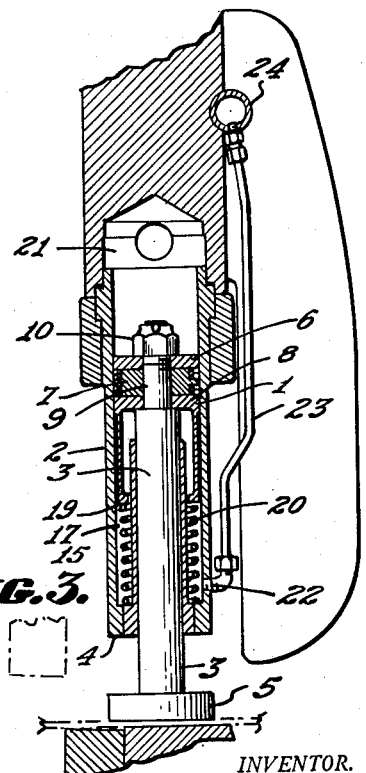
Figure 3 is a cross section of one of my hydraulic hold-downs similar to Figure 2 but with the hold-down foot in lowered or operative position.

The hydraulic hold-down is actuated by a mechanism in the shear and operates by fluid under pressure entering the chamber 21 in the cylinder 2 above the piston 1 and hence forcing the piston together with its piston rod and hold-down foot 5 downwardly as shown in Figure 3. When this pressure is removed by mechanism in the shear, the return spring 20 forces the piston and its attenuating fixtures upwardly by pressing on the lower edge 19 of the skirt 18.

When oil seeps from the chamber 21 past the piston 1, it is restricted to a space against the inner wall of the cylinder 2 by the skirt 18 and directed to the interior of the well 17. An outlet port 22 is provided in the well 17 and a connection 23 is made between the port 22 and a suction line 24. The suction line 24 is connected to a suction pump and the oil recovered from the well 17 is discharged into an oil sump. From the above it is apparent that I have provided a hydraulic hold-down having a metallic piston operated hold-down foot and which is provided with means for preventing oil which seeps past the piston from flowing on the work. I have also provided a very tight and wearable piston which may be easily assembled without the necessity of springing apart any piston rings.

While in the above description and drawing I have described and shown a hydraulic hold-down for use on a power shear, it is to be understood that I do not intend to limit my hold-down for this specific purpose since my hydraulic hold-down may be used with other machine tools on other devices where material or work must be held down or clamped.

Modifications may be made in my exemplary structure without departing from the spirit of my invention. Having thus described my invention in an exemplary embodiment, what I claim as new and desire to secure by Letters Patent is:

1. In a hydraulic hold-down, a hydraulically operated piston mounted in a vertical cylinder and having a piston rod projecting from the lower end of said cylinder and carrying a hold-down foot, a tube surrounding a portion of said piston rod and spaced from the interior wall of said cylinder, a fluid tight seal between the lower edge of said tube and said cylinder wall so as to provide a well between the tube and cylinder wall, and an outlet port adjacent the bottom of said well, said piston having a downwardly projecting skirt the lower edge of which is at all times within the well.

2. In a hydraulic hold-down, a hydraulically operated piston mounted in a vertical cylinder and having a piston rod projecting from the lower end of said cylinder and carrying a hold-down foot, a tube surrounding a portion of said piston rod and spaced from the interior wall of said cylinder, a fluid tight seal between the lower edge of said tube and said cylinder wall so as to provide a well between the tube and cylinder wall, and an outlet port adjacent the bottom of said well, said piston having a downwardly projecting skirt the lower edge of which is at all times within the well, and a piston return spring within the well and operatively positioned between the well bottom and the lower skirt edge.

3. In a hydraulic hold-down, a hydraulically operated piston mounted in a vertical cylinder and having a piston rod projecting from the lower end of said cylinder and carrying a hold-down foot, a tube surrounding a portion of said piston rod and spaced from the interior wall of said cylinder, a fluid tight seal between the lower edge of said tube and said cylinder wall so as to provide a well between the tube and cylinder wall, and an outlet port adjacent the bottom of said well, said piston having a downwardly projecting annular skirt spaced from the interior wall of the cylinder and with its lower edge at all times within the well.

4. In a hydraulic hold-down a hydraulically operated piston mounted in a cylinder and having a piston rod carrying a hold-down foot, a well provided within the cylinder beyond the piston path and on the low pressure side of the piston and an outlet port in said well to permit removal of fluid seeping past the piston, said outlet port being connected to a suction line, and fluid directing means incorporated in said piston for directing seeped fluid to said well.

5. In a hydraulic hold-down a hydraulically operated piston mounted in a cylinder and having a piston rod carrying a hold-down foot, a well provided within the cylinder beyond the piston path and on the low pressure side of the piston and an outlet port in said well to permit removal of fluid seeping past the piston, and fluid directing means incorporated in said piston for directing seeping fluid to said well.

6. In a hydraulic hold-down a hydraulically operated piston mounted in a vertical cylinder and having a piston rod projecting from the lower end of said cylinder and carrying a hold-down foot, a well provided within the cylinder below the piston path in the low pressure side of the cylinder, an outlet port in said well to permit removal of fluid seeping past the piston, said piston having a downwardly projecting skirt spaced from the cylinder wall and from the piston rod for directing seeping fluid to said well.

MERRILL W. HAZELTON.

REFERENCES CITED

The following references are of record in the file of this patent:

UNITED STATES PATENTS

| Number | Name | Date |
|---|---|---|
| 1,728,591 | Brauer | Sept. 17, 1929 |
| 1,751,350 | Moyer et al. | Mar. 18, 1930 |
| 2,003,769 | Christenson | June 4, 1935 |
| 2,145,384 | Allin | Jan. 31, 1939 |
| 2,355,721 | Foutz | Aug. 15, 1944 |
| 2,374,011 | Gunderson | Apr. 17, 1945 |
| 2,394,364 | Christensen | Feb. 5, 1946 |
| 2,442,057 | Page | May 25, 1948 |
| 2,464,710 | Patterson | Mar. 15, 1949 |
| 2,514,016 | Valbuena Casado | July 4, 1950 |

FOREIGN PATENTS

| Number | Country | Date |
|---|---|---|
| 411,193 | Great Britain | June 7, 1934 |